United States Patent [19]

Kuroda et al.

[11] 4,414,369

[45] Nov. 8, 1983

[54] CONTINUOUS PROCESS FOR THE PREPARATION OF POLYOLEFINS HAVING WIDELY DISTRIBUTED MOLECULAR WEIGHTS

[75] Inventors: Nobuyuki Kuroda, Yokohama; Tatsuo Horie, Tokyo; Kazuo Matsuura, Kawasaki; Kunimichi Kubo, Tokyo; Mituji Miyoshi, Ninomiya, all of Japan

[73] Assignee: Nippon Oil Company, Limited, Tokyo, Japan

[21] Appl. No.: 138,104

[22] Filed: Apr. 7, 1980

Related U.S. Application Data

[63] Continuation of Ser. No. 911,761, Jun. 2, 1978, abandoned.

[30] Foreign Application Priority Data

Aug. 17, 1977 [JP] Japan .................................. 52-97747
Jan. 6, 1978 [JP] Japan ...................................... 53-204

[51] Int. Cl.³ ............................. C08F 2/14; C08F 4/66
[52] U.S. Cl. ........................................ 526/65; 525/53; 525/240; 526/66; 526/348; 526/348.6; 526/352
[58] Field of Search ...................... 526/65, 66; 525/53

[56] References Cited

U.S. PATENT DOCUMENTS

| | | | |
|---|---|---|---|
| 3,592,880 | 7/1971 | Diedrich et al. | 260/278 |
| 3,718,632 | 2/1973 | Gardner et al. | 526/65 |
| 4,014,859 | 3/1977 | Cooper et al. | 526/65 |

FOREIGN PATENT DOCUMENTS 46-639 8/1971 Japan.
1233599 5/1971 United Kingdom.

*Primary Examiner*—Stanford M. Levin
*Attorney, Agent, or Firm*—Jordan and Hamburg

[57] ABSTRACT

Polyolefins having a wide distribution of molecular weights are prepared in a plural stage process, by initially polymerizing the olefins in the presence of a solvent, hydrogen and a highly active Ziegler type catalyst under pressure, and beneath a gas phase containing an inert gas, to form in the first stage a polymer having a relatively high molecular weight. The polymerization reaction mixture from the first stage is continuously flowed to a second stage reactor. The second stage reactor is maintained at a relatively lower pressure, such that the flow is driven by the higher pressure in the first stage. The second stage is agitated and the polymerization reaction mixture is maintained beneath an atmosphere containing olefins and hydrogen gas. Polymers of relatively low molecular weight are formed in the second stage. The product continuously removed from the second stage contains a polymer having a wide distribution of molecular weight.

13 Claims, 1 Drawing Figure

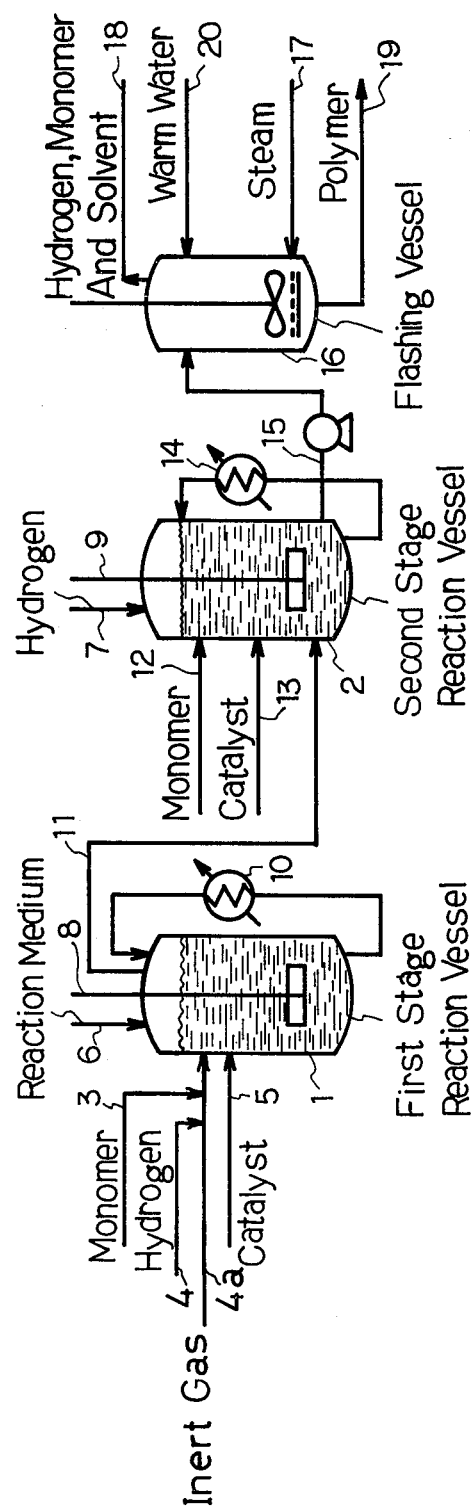

CONTINUOUS PROCESS FOR THE PREPARATION OF POLYOLEFINS HAVING WIDELY DISTRIBUTED MOLECULAR WEIGHTS

This is a continuation of application Ser. No. 911,761, filed June 2, 1978, now abandoned.

BACKGROUND OF THE INVENTION

1. Field of the Invention

The present invention relates to a process for continuously preparing polyolefins having widely distributed molecular weights, and more particularly to a process for continuously preparing polyolefins having widely distributed molecular weights employing a highly active Ziegler type catalyst comprising a transition metal compound supported on a solid carrier and an organometallic compound and by the use of a plurality of reactors, each of the first and second stage reactors being kept in a condition under which desired polymerization reaction takes place.

2. Prior Art

Polyolefins commonly used for forming various molded articles, e.g. bottles, cable tubes and very thin films, must be fairly adapted to the molding conditions when they are brought to plasticized states and must be easily molded in desired shapes. Polyolefins having high melt indices, i.e. those having low average molecular weights, have improved moldabilities or workabilities due to flow characteristics, but they are deteriorated in their mechanical strengths, such as impact strength and tensile strength. On the other hand, polyolefins having low melt indices are improved in their strengths, but their moldabilities are poor. It is well known in the art that this contradictory problem can be solved by using polyolefins having widely distributed molecular weights.

In recent years, properties required of polyolefins become manifold, and there is a tendency of decreasing the amount of resins to be used as small as possible for saving resources as far as the required properties are satisfied. For instance, it has been tried to decrease the wall thicknesses of a bottle or of a film while retaining satisfactory strengths. Under these circumstances, there is an increasing demand for polyolefins which have good workabilities due to flow characteristics, high impact strengths, high tensile strengths and improved environmental stress cracking resistance, and which will give molded articles of good properties even when the amounts of the resins to be used are small.

Several processes for preparing polyolefins having widely distributed molecular weights wherein olefins are polymerized in multi-stage polymerization reactions, have been known. For example, such processes are disclosed in Japanese Kohkoku Pat. No. 42716/73 (Patent Publication No. 42716/73) and Japanese Kohkai Pat. No. 639/71 (Provisional Patent Publication No. 639/71). Each of these known processes comprises the first stage wherein the polymerization is effected by the use of a specific organometallic compound and in the presence of a large amount of hydrogen for forming relatively low molecular weight polymers, and the second stage wherein the polymerization is effected in the presence of a small amount of hydrogen for forming relatively high molecular weight polymers. However, this known process is disadvantageous in that an operation for separating and recirculating the hydrogen is required since the amount of hydrogen existing in the first stage is large. Moreover, the properties of the resin obtained by this process are not satisfactory in that a gelled mass tends to form in the molding step to result in poor molding qualities so that the strengths of the molded article are inferior.

Japanese Kohkoku Pat. No. 11349/71 Patent Publication No. 11349/71) discloses a process comprising the initial stage of effecting polymerization by the use of a predetermined amount of a specific polymerization catalyst in the presence of a small amount of hydrogen, and the subsequent stage of effecting polymerization in the presence of a large amount of hydrogen. However, this publication only discloses a discontinuous process, i.e. batch process, for preparing polyolefins, but not specifically referred to a continuous process for preparing polyolefins having widely distributed molecular weights, nevertheless the continuous process is more convenient from the industrial standpoint of view. In such a batch process for preparing a polyolefin, the first stage polymerization reaction is carried out under the predetermined condition in a single reactor in which a gas phase is normally existing at the upper portion thereof, and after the completion of the first stage reaction the condition is adjusted to suit for the second stage reaction, and then the second stage reaction is carried out in the same reactor in which a gas phase is also existing at the upper portion thereof. This process is disadvantageous from the industrial standpoint of view in that it requires complicated operations, that the production efficiency thereof is lowered and that difficulties are encountered in delicately controlling the reactions.

The present invention is particularly concerned with an industrially convenient process for continuously preparing polyolefins which have widely distributed molecular weights and superior properties by the use of a highly active Ziegler type catalyst comprising a transition metal compound supported on a carrier and an organometallic compound. The process for polymerizing olefins using the highly active Ziegler type catalyst has a very important advantage in that a step of removing the catalyst from the formed polymers can be avoided because of the fact that a large amount of polymers are formed with an extremely small amount of the catalyst. However, when polyolefins having widely distributed molecular weights are prepared with the use of the aforementioned highly active Ziegler type catalyst, and particularly when they are prepared by a generally known process other than the process of the present invention by the use of the multi-stage polymerization method which comprises an initial stage of forming relatively high molecular weight polymers and a successive stage of forming relatively low molecular weight polymers, the following difficulties will arise:

In order to prepare high molecular weight polymers in the initial or first polymerization stage, the first stage polymerization must be carried out in the absence of hydrogen or the concentration of hydrogen in the first stage should be low. As a result, a large amount of polymers is formed in an extremely short period of time due to the high activity of the catalyst. Particularly, if a gas phase mainly composed of a monomer is present in the polymerization reactor of the first stage, the concentration of the olefin monomer in the liquid phase is increased and it becomes difficult to control the monomer concentration in the liquid phase below the desired low level. With the increase in monomer concentration, the polymer formation is further accelerated to give polymers in short period of time that it becomes extremely difficult to control the reaction. It is, therefore, desirable to effect polymerization under a condition wherein the concentration of the monomer in the gas phase is low. However, the decrease in monomer concentration inevitably causes reaction pressure drop and necessitates provision of certain forced means such as a transfer pump for delivering the reaction product to the second stage, which means would cause fouling or blockage of the transfer passage.

Also, in the successive or second stage wherein relatively low molecular weight polymers are formed, the polymerization must be carried out with an increased concentration of hydrogen so that the polymer yield per unit time in the second stage is considerably decreased as compared to that in the first stage. Although the presence of a gas phase existing at the upper portion of the reactor and sufficiently enriched with the monomer is effective to increase the yield of polymers in the second stage, it is difficult to increase the monomer concentration to a satisfactory high level since a large amount of hydrogen is present in the polymerization reactor of the second stage. Further, even when a sufficient amount of the monomer is present in the second stage, the yield of polymers per unit time is decreased as compared to that obtainable in the polymerization reactor of the first stage.

If the yield of polymers in the first stage, i.e. the stage for forming high molecular weight polymers, is exceedingly increased and the yield of polymers in the second stage, i.e. the stage for forming low molecular weight polymers, is extremely decreased, the distribution of molecular weight of the resulting polymer is not sufficiently wide, and besides the polymer contains excessive amount of high molecular weight polymers, thus resulting in poor moldability.

In order to overcome the aforementioned disadvantages, it is advisable to use a smaller reactor in the first stage as compared to the polymerization reactor used in the second stage. However, when a small polymerization reactor is used in the first stage, the residence time of the reaction mixture in the first stage becomes too short to make the reaction condition uniform so that the reproducibility of the process might be badly affected. Furthermore, complicated operations are required for operating the small and large polymerization reactors mounted in line with one another in a continuous operation mode.

OBJECTS AND SUMMARY OF THE INVENTION

An object of the present invention is to provide a process for continuously preparing polyolefins having widely distributed molecular weights wherein the reaction mixture is transferred from the first stage reactor to the second stage agitating reactor by the pressure difference without using any forced transfer means.

Another object of the present invention is to provide a process for preparing polyolefins having widely distributed molecular weights and having good workabilities due to flow characteristics, high impact strengths, high tensile strengths and improved environmental stress cracking resistances.

A further object of the present invention is to provide a process for continuously preparing polyolefins having widely distributed molecular weights, which is simple in operation and has good producibility and in which it is possible to control the reactions delicately.

Yet a further object of the present invention is to provide a process for preparing polyolefins having widely distributed molecular weights in good yield.

These and other objects of the invention will become apparent from the following description.

According to the present invention there is provided a process for preparing polyolefins having widely distributed molecular weights, wherein olefins are polymerized in the presence of a solvent, hydrogen and a highly active Zieger type catalyst comprising a transition metal compound supported on a solid carrier and an organometallic compound, and which comprises the steps of polymerizing said olefins in a plurality of reactors, the olefin polymerization in a first stage reactor being effected under pressure under a condition wherein a gas phase containing an inert gas is existing at the upper portion of said reactor, continuously transferring the polymerization mixture containing high molecular weight polymer particles dispersed in said solvent from said first stage reactor without virtually separating any part of the components of said reaction mixture and without using any forced transfer means into a second stage agitating reactor maintained at a pressure lower than that of said first stage reactor by the pressure difference, the olefin polymerization in said second stage agitating reactor being effected in the presence of hydrogen under a condition wherein a gas phase containing the olefins and hydrogen is existing at the upper portion of said second stage reactor for forming polymers having the molecular weights lower than those of the polymers formed by the first stage polymerization, and recovering the polymers by continuously removing the polymerization reaction mixture containing the formed particles dispersed in said solvent from said second stage reactor.

DESCRIPTION OF THE INVENTION

If the first stage polymerization is effected under a condition wherein a gas phase containing an inert gas is existing, the polymerization reaction can be readily controlled, for instance the heat of reaction can be easily removed since the reaction may take place even when the concentration of hydrogen is low and the concentration of the monomers is also relatively low, and the internal pressure in the first stage reactor can be maintained at a sufficiently high pressure due to the inert gas pressure so as to make it possible to conveniently transfer the reaction mixture to the second stage kept at a lower pressure without using any forced transfer means.

We have also found that the environmental stress cracking resistance and the impact strength of the resulting polymers are remarkably improved when one or more of olefin comonomers is supplied to the first stage reactor. It is surprising that the properties just mentioned above are not improved if said one or more of comonomers is not introduced into the first stage reactor but is introduced only into the second stage agitating reactor, as will be described hereinbelow in Examples 4 and 6. It is not essential that the olefin comonomers be present in the reactors of the second and subsequent stages, but they may be present if it is desired to decrease the density of the prepared polyolefins to a lower value.

The advantageous features of the process of the present invention may be summarized as follows:

(1) Polyolefins having widely distributed molecular weights can be produced through continuous multistage reactions at high yield.

(2) The production ratio between the high molecular weight polymers and the low molecular weight polymers can be accurately controlled within a wide range, and the distribution of each of the prepared polyolefins may be freely varied as desired.

(3) It is not particularly required to use small polymerization reactor in the first stage so that the reaction mixture is held therein for a residence time enough for forming polymers in good reproducibility.

(4) Since the process of the invention is a continuous process comprising the first stage of forming relatively high molecular weight polymers and the successive or second stage of forming relatively low molecular weight polymers, the prepared polymer does not contain any gel, thus uniform molded articles can be molded therefrom.

(5) Since the polymerization reactions can be effected under sufficiently controlled condition through the process wherein the pressure of the first stage is higher than that of the successive stage, the reaction product from the first stage can be continuously transferred to the next stage without using any forced transfer means. Even if the product from the first stage is in the form of a slurry, it does not interfere with the continuous operation of the process.

(6) Polyolefins having particularly improved workabilities due to flow characteristics and physical properties can be produced when copolymers of two or more olefins are formed in the first stage wherein the reaction for forming high molecular weight polymers takes place in the continuous multi-stage reaction process.

BRIEF DESCRIPTION OF THE DRAWING

The present invention will now be described with reference to the accompanying drawing in which:

a single FIGURE is a flow diagram showing the process of the invention including the first stage of effecting polymerization in the presence of an inert gas.

PREFERRED EMBODIMENT OF THE INVENTION

Referring to the drawing, an upstanding agitating vessel 1 is provided with an agitator 8 and may be employed as an embodiment of the first stage ractor in the present invention. When an upstanding agitating vessel is used, the ratio of the height to the diameter thereof is may be generally 1 to 10, preferably 1.5 to 5, and a pressure vessel having a diameter of generally about 0.5 to 10 m, preferably 1 to 5 m, may be used. Also, in the present invention, reactors of other type, such as tubular reactors and recirculating mixer reactors may be preferably used. In the system, a raw olefin in a gaseous or liquefied form is fed through a line 3 to a reaction vessel 1. Usable olfins include generally those having 2 to 6 carbon atoms, and preferably lower olefins such as ethylene, propylene, and butene-1. Alternatively, a main monomer and an olefin comonomer may be fed through the line 3 to the reaction vessel 1 in gaseous or liquefied form. The olefin comonomer may be separately fed through another line (not shown) to the vessel. A single olefin selected from the olefins having 2 to 6 carbon atoms such as ethylene or propylene may be used as the main olefin monomer. In the process of the invention, ethylene is the most preferred main monomer. Examples of olefins which may be used as the olefin comonomer are olefins other than the one used as the main monomer and having 2 to 8 carbon atoms such as ethylene, propylene, butene-1, pentene-1, 4-methylpentene-1, hexene-1, heptene-1 and octene-1 and preferable being olefins having 3 to 6 carbon atoms. It is preferred to feed the comonomer to the first stage reaction vessel 1 in a ratio of 0.1 to 10 mol % per mol of the main monomer. A single comonomer or a plurality of comonomers may be used. Incidentally, in order to improve the properties of the polyolefins prepared according to the process of the present invention, diolefins such as butadiene, isoprene, piperylene, 1,4-hexadiene or 5-ethyldienenorbornene may be added in an amount of 1/10 mol % based on the amount in mol of the olefins. The term "polyolefins" according to the invention include those containing such diolefins.

A liquid polymerization reaction medium is fed through a line 6. Generally usable liquid reaction medium are inert organic solvents, and hydrocarbons having 3 to 20 carbon atoms including aliphatic, aromatic and alicyclic hydrocarbons are preferred, the representative examples of preferred reaction medium being butane, pentane, hexane, heptane, benzene, toluene and cyclohexane. A small amount of hydrogen is fed through a line 4, if desired. As is mentioned hereinbefore, relatively high molecular weight polymers are formed in the first stage of the process of the invention, and thus the polymerization in the first stage may be effected without feeding hydrogen thereto. However, a small amount of hydrogen may be fed to the first stage, if required, so as to let the concentration of hydrogen in the first stage be about three quarters or less, e.g. about one half to one fiftieth, of that in the second stage. The polymerization in the first stage reaction vessel 1 is effected generally at 30° to 100° C., preferably at 40° to 95° C., at a pressure of generally 2 to 100 kg/cm², preferably 6 to 70 kg/cm². The pressure in the first stage reaction vessel 1 is maintained higher than that in the second stage agitating vessel 2 by the value of about 10 kg/cm² or less, preferably by about 5 to 0.1 kg/cm². The concentration of monomers (in the liquid phase) in the first stage reaction vessel 1 may be 5 to 200% of that (in the liquid phase) in the second stage agitating vessel 2. It is preferred to keep the concentration of monomers in the first stage within the range of 20 to 100% as that in the second stage reaction vessel 2, i.e. the monomer concentration in the first stage reaction vessel be preferably kept not higher than that in the second stage reaction vessel.

In the system shown, an inert gas is introduced through a line 4a and the polymerization is effected under a condition wherein a gas phase containing the inert gas is existing at the upper protion of the reaction vessel 1. The polymerization reaction takes place under the condition in which the fed monomers and/or a small amount of hydrogen are dissolved in the reaction medium. In the polymerization process according to the present invention, formed polymer particles are dispersed in the solvent. The polymerization reaction proceeds under the condition in which an inert gas, monomers and optionally a small amount of hydrogen are present in the gas phase. The concentration of the inert gas in the gas phase may be 20 to 99 mol %, preferably 40 to 99 mol %, and most preferably 60 to 99 mol %. If the concentration of the inert gas is too low, the concentration of monomers becomes exceedingly high and the object of the present invention can not be attained. As the inert gases which may be used in the process of the invention, there may be mentioned nitrogen, helium, neon, argon and methane, nitrogen being the most preferred one.

In the embodiment shown in the FIGURE, a catalyst is fed through a line 5. In general, the catalyst may be fed to the reaction vessel while being mixed with and dispersed in said solvent. The catalyst used in the invention is a highly active Ziegler type catalyst comprising a transition metal compound supported on a solid carrier and an organometallic compound. The catalyst used in the present invention will be described in detail.

The catalyst which may be used in the process of the present invention comprises a solid component combined with an organometallic compound from a metal of Group I-IV of the Periodic Table, preferably with an organoaluminium or organozinc compound, and has the catalytic activity of generally higher than 50 g. polymer/g. catalyst.hr.olefin-pressure (kg per cm$^2$), preferably higher than 100 g. polymer/g. catalyst.hr.olefin-pressure (kg per cm$^2$). Said solid component comprises a solid carrier and a transition metal compound supported on said carrier. Substances which may be used as the solid carrier include metallic magnesium, magnesium hydroxide, magnesium carbonate, magnesium oxide, various aluminas, silica, silica-alumina and magnesium chloride; double salts, double oxides, hydrated carbonate and hydrated silicates of a metal or metals selected from the group consisting of magnesium, silicon, aluminium and calcium; and those obtained by treating or reacting the substances stated above with an oxygen-containing compound, a sulfur-containing compound, hydrocarbons or a halogen-containing compound. As the transition metal compound which is supported on the solid carrier, there may be mentioned halides, alkoxy halides, oxides and halogenated oxides of Ti, V, Zr and Cr. Specific examples of the catalysts usable in the present invention are those prepared by combining an organoaluminium or organozinc compound with a solid component, such as MgO-R$_x$-TiCl$_4$ system (See Japanese Kohkai Pat. No. 27586/74), Al$_2$O$_3$-AlX$_3$.ORR'-TiCl$_4$ system (See Japanese Kohkai Pat. No. 86480/74), RMgX-TiCl$_n$(OR)$_{4-n}$ (See Japanese Kohkai Pat. Nos. 72384/74 and 86483/74), Al$_2$O$_3$-SO$_3$-TiCl$_4$ system (See Japanese Kohkai Pat. Nos. 100182/75, 151977/75 and 144794/75), Mg-SiCl$_4$-ROH-TiCl$_4$ system (See Japanese Kohkai Pat. No. 86481/74), MgCl$_2$-Al(OR)$_3$-TiCl$_4$ system (See Japanese Kohkai Pat. Nos. 90386/74 and 64381/75), MgCl$_2$-SiCl$_4$-ROH-TiCl$_4$ system (See Japanese Kohkai Pat. No. 106581/74) and Mg(OOCR)$_2$-Al(OR)$_3$-TiCl$_4$ system (See Japanese Kohkai Pat. No. 120980/74). In the meanwhile, a portion or all of said organometallic compound may be directly fed to the reaction vessel through another feeding line while being dissolved in a solvent separately rather than being combined with said solid component.

A jacket is provided around the wall of the first stage section vessel 1 for passing a cooling medium therethrough. A cooler 10 is mounted in line with a recirculation passage for the polymerization reaction mixture. The heat of reaction may be removed either by flowing a cooling medium through the jacket or by recirculating the reaction mixture through the cooler 10, or both measures may be taken as the case may be. The first stage reaction vessel 1 as shown includes generally one reactor, but a plurality of reactors (not shown), which are operated under the substantially same condition, may be connected in line with or in series with one another.

The polymerization reaction mixture from the first stage reaction vessel 1 is continuously transferred through a line 11 to the second stage agitating vessel 2 provided with an agitator 9 by the pressure difference without using any forced delivering or transfer means such as a pump. Since no forced transfer means is used, there is almost no danger of the occurrence of fouling or blockage.

The process of the present invention is operated continuously without virtually separating any portion of the components of the polymerization mixture. Accordingly, it has an advantage of eliminating a separating operation of handling a pressurized mixture which contains polymers and which tends to cause fouling. Hydrogen and additional monomers are supplied, respectively, through a line 7 and a line 12, to the polymerization reaction mixture delivered to the second stage agitating vessel 2, and the polymerization is effected continuously. Hydrogen is fed in an amount such that the concentration of H$_2$ in the gas phase is in the range of generally from 30 to 95 mol %, preferably from 40 to 90 mol %.

The concentration of the monomer in the gas phase contained in the second stage agitating vessel 2 may be varied within the range of from 5 to 70 mol %, preferably from 10 to 60 mol %, and the concentration of the monomer in the liquid phase is correspondingly determined depending upon the polymerization temperature and pressure and the kind of the monomer used.

In case where copolymerization is effected in the first stage agitating vessel, an additional amount of a comonomer may be fed through the line 7 or another line (not shown). The amount of the added comonomer may be varied such that the molar ratio thereof is 0.1 to 10 mol % per mol of the main monomer contained in the second stage agitating vessel.

An additional catalyst may be fed through a line 13, as required. The second stage vessel 2 may be substantially similar in shape as the one employed as the first stage reactor, and an upstanding agitating vessel may be used for this purpose. The temperature of the second stage agitating vessel is kept at generally 50° to 100° C., preferably 60° to 95° C., and the pressure thereof being kept at the value lower than that of the first stage reactor, as described above. The heat of polymerization reaction is removed by the use of a cooler 14. Although there is shown a method of recirculating the liquid phase in the accompanying drawing, cooling may be effected alternatively by a method of removing the gas phase in the second stage agitating vessel, and cooling the same to liquefy the portion of the solvent vapor or the monomer which is then recirculated into the vessel (not shown). In the process of the present invention, the polymerization reaction in the second stage is effected in the presence of a gas phase containing the olefins and hydrogen at the upper portion of the second stage agitating vessel. For this reason, the polymerization reaction in the second stage may be easily controlled by adjusting the temperature and pressure in the vessel, and the concentrations of the monomer and hydrogen may be maintained at a higher level.

Similarly as in the first stage, the polymer particles formed by the second stage polymerization are dispersed in the solvent.

According to the process of the invention, the first stage polymerization further continues in the second stage. The ratio between the high molecular weight polymers and the low molecular weight polymers in the formed reaction product may be freely selected in a wide range. However, it is generally desirable to prepare a composition composed of 5 to 70% by weight of the high molecular weight polymers and 30 to 95% by weight of the low molecular weight polymers, preferable composition being composed of 10 to 60% by weight of the high molecular weight polymers and 40 to 90% by weight of the low molecular weight polymers.

The polymerization reaction mixture from the second stage is removed continuously through a line 15, and the polymers are recovered from the solvent. The second stage agitating vessel 2 as shown includes generally one reactor, but two or more of reactors (not shown), which are operated under the substantially same condition, may be connected in line with or in series with one another.

The present invention has the characteristic features as described hereinabove, and provides an advantageous process for preparing polyolefins having widely distributed molecular weights on an industrial scale. Polymers may be recovered from the polymerization reaction mixture removed from the second stage agitating vessel by any of the conventional methods for recovering polyolefins. It should be noted that a step of removing inorganic residues which are derived from the catalyst may be eliminated since the highly active Ziegler type catalyst comprising a transition metal compound supported on a solid carrier and an organometallic compound is employed in the process of the invention. Polymers may be, for instance, recovered from the polymerization reaction mixture by a method of introducing the reaction mixture through the line 15 into a flashing vessel 16 into which steam is fed through a line 17 to distill off the residual hydrogen, unreacted monomers and solvent. Polymers are recovered through a line 19 in the form of a water slurry by introducing warm water through a line 20. The hydrogen, monomers and solvent distilled off from the reaction mixture may be refined in a refining step (not shown) and returned to the process for reuse. In the polymer recovery step of the process of the present invention, two or more of flashing vessels may be provided in line with one another for perfectly recovering the unreacted materials and the solvent.

EXAMPLES OF THE INVENTION

The present invention will be further described in detail with reference to several examples thereof.

EXAMPLE 1

Using the system shown in the drawing, polymerization was effected in accordance with the illustrated polymerization process. 1.35 m$^3$/hr of hexane, 1.0 mol/hr of triethylaluminum, 9.0 g/hr of a catalyst comprising TiCl$_4$ supported on a solid carrier including anhydrous magnesium chloride and 15 kg/hr of ethylene were continuously fed to an agitating reactor of 0.9 m$^3$ internal volume which was maintained at 85° C. The upper portion of the reactor was then purged with pressurized nitrogen gas to form an inert gas phase, and the reactor was maintained at a gauge pressure of 17.0 kg/cm$^2$. The polymerization reaction mixture slurry from the first stage reactor was delivered from the bottom of the reactor through a conduit to a 2.0 m$^3$ second stage agitating vessel by the pressure difference, and added with ethylene, propylene and hydrogen in the second stage vessel which was maintained at 85° C. and at a total gauge pressure of 16 kg/cm$^2$, the volume of the liquid phase being kept at 1.5 m$^3$. The molar ratio of ethylene:propylene:hydrogen in the gas phase contained in the second stage vessel was maintained at 29.0:1.0:70. This two stage polymerization was operated very stably for 100 hours. The reaction mixture was removed, and the polymers were recovered and dried to obtain 4,850 kg of a mixture of widely distributed molecular weight polyethylenes of a bulk density 0.31, a melt index 0.059, a flow parameter $$\left( \log \frac{\text{Melt Index at the Loading of 21.6 kg}}{\text{Melt Index at the Loading of 2.16 kg}} \right)$$

2.32 and a density 0.9523 g/cm$^3$. The molding qualities of the polyethylene thus obtained was excellent. A 10 $\mu$ thick film was molded therefrom, and it was found that the number of gels formed on the film was greatly decreased to 15/1000 cm$^2$. The properties of the film were also satisfactory.

EXAMPLE 2

Using the system shown in the drawing, 1.35 m$^3$/hr of hexane, 1.0 mol/hr of triethylaluminum, 9.0 g of the Ti-containing solid catalyst which was the same as used in Example 1, 39 kg/hr of ethylene and 27 g/hr of hydrogen were continuously fed to a 0.9 m$^3$ first stage reactor which was maintained at 85° C. The upper portion of the reactor was then purged with nitrogen gas to form an inert gas phase, and the reactor was maintained at a gauge pressure of 16.2 kg/cm$^2$. The slurry from the first stage reactor was delivered through a conduit to a 2.0 m$^3$ second stage agitating vessel by the pressure difference, and added with ethylene, propylene, and hydrogen in the second stage vessel which was maintained at 85° C. and at a total gauge pressure of 15.8 kg/cm$^2$, the volume of the liquid phase being kept at 1.5 m$^3$. The molar ratio of ethylene:propylene:hydrogen in the gas phase contained in the second stage vessel was maintained at 39.1:1.2:59.7. This two stage polymerization was operated very stably for 100 hours. The reaction mixture was continuously removed, and the polymers were recovered and dried to obtain 9,150 kg of a mixture of widely distributed molecular weight polyethylenes of a bulk density 0.33, a melt index 0.36, a flow parameter 2.01 and a density 0.9550 g/cm$^3$. The molding qualities of the polyethylene thus obtained were excellent, and the properties of a bottle molded therefrom by means of the blow molding were also satisfactory.

EXAMPLE 3

Using the system shown, polymerization was effected in accordance with the illustrated polymerization process. 1.35 m$^3$/hr of hexane, 1.0 mol/hr of triethylaluminum, 9.0 g of the Ti-containing solid catalyst which was the same as used in Example 1, 37 kg/hr of ethylene, 1.3 kg/hr of butene-1 and 25 g/hr of hydrogen were continuously fed to an agitating reactor of 0.9 m$^3$ internal volume, and the reactor was maintained at 85° C. The upper portion of the reactor was then purged with nitrogen gas to form an inert gas phase, and the reactor was maintained at a gauge pressure of 17.0 kg/cm². The polymerization reaction mixture slurry from the first stage reactor was delivered from the bottom of the reactor through a conduit to a 2.0 m³ second stage agitating vessel by the pressure difference, and added with ethylene and hydrogen in the second stage vessel which was maintained at 85° C. and at a total gauge pressure of 16 kg/cm², the volume of the liquid phase being kept at 1.5 m³. The molar ratio of ethylene:hydrogen in the gas phase contained in the second stage vessel was maintained at 35:65. This two stage polymerization was operated very stably for 100 hours. The reaction mixture was continuously removed, and the polymers were recovered and dried to obtain 9,630 kg of a mixture of widely distributed molecular weight polyethylenes of a bulk density 0.33, a melt index 0.32, a flow parameter 2.05 and a density 0.9548 g/cm³. The stiffness of the polymer thus obtained measured by the ASTM D747-63 method was $13.1 \times 10^4$ psi, the environmental stress cracking resistance (ESCR) thereof measured by the ASTM D-1693-60T method was 128 hr, and the critical shear rate measured by using an Instron rheometer was 1710 sec$^{-1}$. These figures show that the properties of this polymer are well balanced.

EXAMPLE 4

1.35 m³/hr of hexane, 1.0 mol/hr of triethylaluminum, 9.0 g/hr of the Ti-containing solid catalyst, which was the same as used in Example 1, 39 kg/hr of ethylene and 27 g/hr of hydrogen were continuously fed to a 0.9 m³ first stage reactor which was maintained at 85° C. The upper portion of the reactor was then purged with nitrogen gas to form an inert gas phase, and the reactor was maintained at a gauge pressure of 16.5 kg/cm². The slurry from the first stage reactor was delivered through a conduit to a 2.0 m³ second stage agitating vessel by pressure difference, and added with ethylene, butene-1 and hydrogen in the second stage vessel which was maintained at 85° C. and at a total gauge pressure of 15.8 kg/cm², the volume of the gas phase being kept at 1.5 m³. The molar ratio of ethylene:butene-1:hydrogen in the gas phase contained in the second stage vessel was maintained at 33.1:1.9:65. This two stage polymerization was operated very stably for 100 hours. The reaction mixture was continuously removed, and the polymers were recovered and dried to obtain 8,930 kg of mixture of widely distributed molecular weight polyethylenes of a bulk density 0.30, a melt index 0.33, a flow parameter 2.02 and a density 0.9556 g/cm³. The stiffness of the obtained polymer was $12.0 \times 10^4$ psi, the ESCR was 38 hr and the critical shear rate was 1010 sec$^{-1}$. These results are inferior as compared to Example 3.

EXAMPLE 5

1.35 m³/hr of hexane, 1.0 mol/hr of triethylaluminum, 9.0 g/hr of the Ti-containing solid catalyst which was the same as used in Example 1, 15 kg/hr of ethylene and 0.7 kg/hr of propylene were continuously fed to a 0.9 m³ first stage reactor which was maintained at 85° C. The upper portion of the reactor was then purged with nitrogen gas to form an inert gas phase, and the reactor was maintained at a gauge pressure of 17.0 kg/cm². The polymerization reaction mixture slurry from the first stage reactor was delivered from the bottom of the reactor through a conduit to a second stage agitating vessel of 2.0 m³ internal volume by the pressure difference, and added with ethylene and hydrogen in the second stage vessel which was maintained at 85° C. and at a total gauge pressure of 16 kg/cm², the volume of the liquid phase in the vessel being kept at 1.5 m³. The molar ratio of ethylene:hydrogen in the gas phase contained in the second stage vessel was maintained at 30:70. This two-stage polymerization was operated very stably for 100 hours. The reaction mixture was continuously removed, and the polymers were recovered and dried to obtain 5,580 kg of a mixture of widely distributed molecular weight polyethylenes of a bulk density 0.29, a melt index 0.061, a flow parameter 2.33 and a density 0.9511 g/cm³. The molding qualities of the polymer thus obtained were excellent. A 10μ film was molded therefrom, and it was found that the number of gels formed on the film was greatly decreased to 9/1000 cm². The Dart impact strength measured in accordance with ASTM D1709-62T was 168 g. The other properties of the film were also satisfactory.

EXAMPLE 6

1.35 m³/hr of hexane, 1.0 mol/hr of triethylaluminum, 0.9 g of the Ti-containing solid catalyst which was the same as used in Example 1 and 15 kg/hr of ethylene were continuously fed to a 0.9 m³ first stage reactor which was maintained at 85° C. The upper portion of the reactor was then purged with nitrogen gas to form an inert gas phase, and the reactor was maintained at a gauge pressure of 17.0 kg/cm². The slurry from the first stage reactor was delivered through a conduit to a second stage agitating vessel of 2.0 m³ internal volume by the pressure difference and added with ethylene, propylene and hydrogen in the second stage vessel which was maintained at 85° C. and at a total gauge pressure of 16 kg/cm², the volume of the liquid phase being kept at 1.5 m³. The molar ratio of ethylene:propylene:hydrogen in the gas phase contained in the second stage agitating vessel was maintained at 29.0:1.0:70. This two stage polymerization was operated very stably for 100 hours. The reaction mixture was continuously removed, and the polymers were recovered and dried to obtain 4,850 kg of a mixture of widely distributed molecular weight polyethylenes of a bulk density 0.31, a melt index 0.059, a flow parameter 2.32 and a density 0.9523 g/cm³. The polymer thus obtained was molded to a 10μ thick film, the Dart impact strength of which was 108 g. This result is inferior as compared to that obtained in Example 5.

While the present invention has been described with reference to the specific examples, it should be understood that the invention is not restricted to such examples, but any change and modification may be made within the spirit and scope of the present invention as recited in the appended claims.

What is claimed is:

1. In a process for preparing polyolefins by polymerizing olefins in the presence of a solvent, hydrogen and a highly active Ziegler-type catalyst comprising a transition metal compound supported on a solid carrier and an organometallic compound, in a plurality of reactors, to prepare polyolefins having widely distributed molecular weights, the improvement comprising:
    (a) polymerizing olefins in a first stage reactor at a temperature of from 30° to 100° C. and a pressure of from 2 to 100 kg/cm², in the presence of a gas phase containing an inert gas in the upper portion of the reactor to form a polymerization reaction mixture comprising a dispersion of relatively high molecular weight polymer particles in the solvent, the concentration of said inert gas in said gas phase being from 40 to 99 mol %;

(b) continuously effecting the flow of the polymerization reaction mixture from the first stage reactor to a second stage reactor, the second stage reactor maintained at a pressure lower than that of the first stage reactor, whereby the flow of polymerization reaction mixture is driven by the pressure difference;

(c) subsequently polymerizing olefins in the second stage reactor, with agitation and beneath a gas phase containing hydrogen and olefins to form polymers having a relatively lower molecular weight, the olefin polymerization in said second stage reactor being effected by supplying hydrogen and additional olefin monomers; and (d) continuously removing from the second stage reactor a polymerization reaction mixture containing polyolefins having widely distributed molecular weights, dispersed in the solvent.

2. The process as claimed in claim 1 wherein an olefin monomer is polymerized in the first stage reactor, and the unreacted olefin monomer and the additional olefin monomer are further polymerized in the second stage reactor.

3. The process as claimed in claim 2, wherein said olefin monomer is selected from the group consisting of ethylene, propylene and butene-1.

4. The process as claimed in claim 1, wherein an olefin monomer is copolymerized with one or more of olefin comonomers in the first stage reactor, and the unreacted olefin monomer and the additional olefin monomer are further polymerized in the second stage reactor.

5. The process as claimed in claim 4, wherein said olefin comonomer is supplied to the first stage reactor in a ratio of 0.1 to 10 mol % based on the amount in mols of the olefin monomer.

6. The process as claimed in claim 4, wherein said olefin monomer is ethylene, and said olefin comonomer is selected from the group consisting of propylene, butene-1, pentene-1, 4-methylpentene-1, hexene-1, heptene-1 and octene-1.

7. The process as claimed in claim 1, 2 or 4, wherein said first stage reactor hydrogen is present and wherein the concentration of said hydrogen present in said first stage reactor is about three quarters or less of that present in said second stage reactor.

8. The process as claimed in claim 1, 2 or 4, wherein the olefin concentration in the liquid phase contained in said first stage reactor is 5 to 200% of that in the liquid phase contained in said second stage reactor.

9. The process as claimed in claim 1, wherein the pressure in said first stage reactor is maintained 10 kg/cm$^2$ or less higher than that in said second stage reactor.

10. The process as claimed in claim 1, 2 or 4, wherein hydrogen is supplied to said second stage reactor such that the hydrogen concentration in the gas phase in the second stage reactor is in the range of from 30 to 95 mol %.

11. The process as claimed in claim 1, wherein the polymerization temperature in said second stage reactor is from 50° to 100° C.

12. The process as claimed in claim 1, wherein the concentration of the inert gas in the first stage gas phase is from 60 to 99 mol %.

13. The process as claimed in claim 1, wherein said inert gas is selected from the group consisting of nitrogen, helium, neon, argon and methane.

* * * * *